United States Patent
Vilanova et al.

(10) Patent No.: US 6,471,332 B1
(45) Date of Patent: Oct. 29, 2002

(54) MULTIPLE MARKER INKJET PRINTING FOR INCREASED PRINT SPEED

(75) Inventors: Ferran Vilanova; Michel Encrenaz; Miquel Boleda, all of Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/773,052

(22) Filed: Jan. 31, 2001

(51) Int. Cl.[7] .................................................. B41J 2/21
(52) U.S. Cl. ........................................................ 347/43
(58) Field of Search .............................. 347/43, 15, 40, 347/9

(56) References Cited

U.S. PATENT DOCUMENTS

| 5,428,377 | A | * | 6/1995 | Stoffel et al. | 347/15 |
| 6,010,205 | A | * | 1/2000 | Billet | 347/40 |
| 6,057,933 | A | | 5/2000 | Hudson et al. | 358/1.9 |
| 6,238,112 | B1 | | 5/2001 | Girones et al. | 400/74 |
| 6,270,187 | B1 | | 8/2001 | Murcia et al. | 347/43 |
| 6,283,572 | B1 | | 9/2001 | Kumar et al. | 347/19 |

* cited by examiner

Primary Examiner—Thinh Nguyen

(57) ABSTRACT

Techniques for printing ink drops in an inkjet printer, where at least one color ink can be printed by two (or more) printheads. The drops to be printed are divided between the two printheads with purposes of higher printer velocity, higher image quality and higher print reliability.

22 Claims, 8 Drawing Sheets

MULTIPLE MARKER INKJET PRINTING FOR INCREASED PRINT SPEED

TECHNICAL FIELD OF THE INVENTION

This invention relates to inkjet printing using two or more printheads of the same color to increase printing speed.

BACKGROUND OF THE INVENTION

Inkjet printing systems are in common use today. An ink jet printer forms a printed image by printing a pattern of individual dots at particular locations of an array defined for the printing medium. The locations are conveniently visualized as being small dots in a rectilinear array. The locations are sometimes "dot locations", "dot positions", or "pixels". Thus, the printing operation can be viewed as the filling of a pattern of dot locations with dots of ink.

Ink jet printers print dots by ejecting very small drops of ink onto the print medium, and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

Color ink jet printers commonly employ a plurality of printheads, for example four, mounted in the print carriage to produce different colors. Each printhead contains ink of a different color, with the commonly used colors being cyan, magenta, yellow, and black. These base colors are produced by depositing a drop of the required color onto a dot location. Secondary or shaded colors are formed by depositing drops of different colors on adjacent dot locations; the human eye interprets the color mixing as the secondary or shading, through well known optical principles.

SUMMARY OF THE INVENTION

The present invention relates to a method to print ink drops in an inkjet printer, and particularly to a printing system and method where at least one color ink can be printed by two (or more) printheads. The method divides the drops to be printed between the two printheads with purposes of higher printer velocity, higher image quality and higher print reliability.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

An objective of the invention is to provide higher speed modes by using an extra black print head in an inkjet printing system. An exemplary application for a printing system using the invention is in a large format printing system for the CAD market, i.e the technical user market (engineers, architects, and the like) who typically print line drawings and image renderings. In an exemplary embodiment, the use of two black print heads enables a print speed of 60 inches per second (ips) and allows laying down two drops per 600 dpi cell (two drops are needed to provide fair optical density). Thus, a methodology is described to print with two black print heads in an inkjet printing system, i.e. how the black channel information is processed through the printing system data pipeline and gets separated to each print head in order to print either the same information or complementary information. Of course, the invention is not limited to increasing speed with two black printheads, but could be employed in using two or more printheads of the same color, e.g. two cyan printheads or three black printheads.

Figure 1:
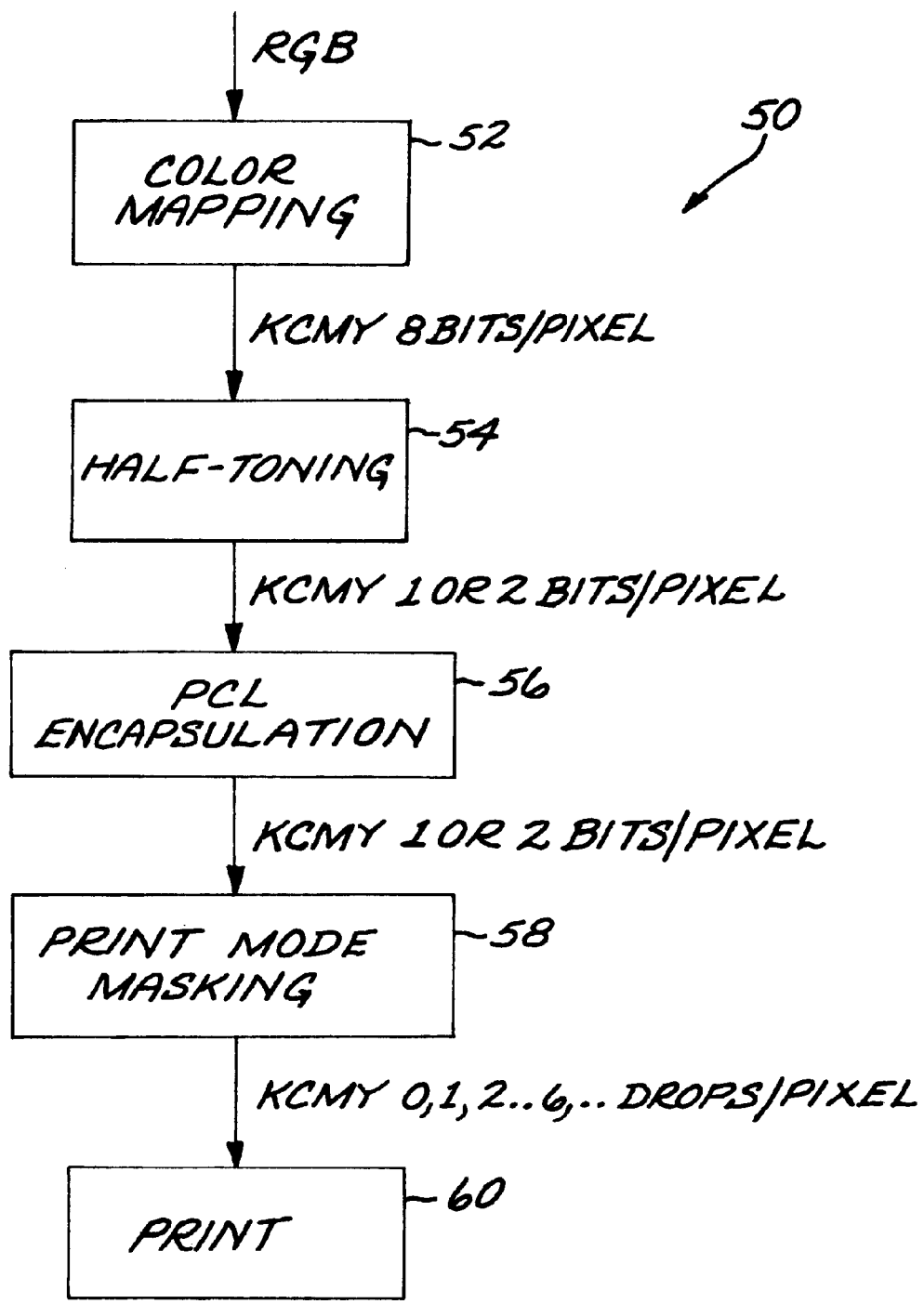
FIG. 1 is a diagram flow chart that describes an exemplary print data pipeline for an exemplary inkjet printing system.

FIG. 1 is a diagrammatic flow chart that functionally describes an exemplary data pipeline 50 for an inkjet printing system. For this embodiment, the inkjet printing system is a color printing system which includes respective printheads for ejecting cyan (C), magenta (M), yellow (Y) and black (K) inks. Print data are provided from the printer driver in RGB (red-green-blue) format to a color mapping function 52, which maps the RGB data into KCMY data, at a resolution of 8 bits per pixel for this example. For this example, the color mapping function converts 8-bit (0–255 values) RGB data into 8-bit KCMY data using an interpolation table. The KCMY data is then processed by a half-toning function 54, to provide KCMY data at 1 or 2 bits per pixel. Next, the half-toned data is processed by a PCL encapsulation function, to produce KCMY data at 1 or 2 bits per pixel. For this example, the PCL encapsulation re-formats the information so that the printer can interpret it; there is no change in resolution or in content for a given pixel. The PCL print data is then passed through a print mode masking function 58, and the masked data is employed to print droplets. This function distributes the print data in different passes for image quality purposes.

As used herein, a "channel" or "plane" for a given color refers to the pixel information to be printed with the given color. As can be seen in FIG. 1, the black channel or plane propagates all the way down the pipeline 50 like the other channels/planes (CMY) from the contone stage (8-bit, coming from the driver) to the actual drops emitted from the printheads during step 60. The separation of the black plane into two planes can occur in any of the steps in FIG. 1, when a fifth plane is added to handle the second black printhead, since there should preferably be a plane dependency between the two black printheads.

An exemplary technique to make the plane separation is that the data for the two black printheads propagate all the way down the pipeline as a single black plane, i.e. through color mapping 52, half-toning 54 and PCL encapsulation 56, and at the masking level (step 58) the separation occurs. Thus, mask level separation occurs at the print mode/mask level 58. There, five printheads are defined so that different masks can be laid down for each of the black printheads, referred to as printheads K1 and K2. In essence, for this exemplary embodiment, the two masks created are complementary, so that at the end of the total number of passes, all the required drops are fired as they were a single unique mask for black. An example of that is the following. Assume that the print mode is a 3-pass print mode, 600*600 dpi 2-bits (4 levels), in which the drops per level are 0, 1, 1, 2. The printing grid for this example is 2400*600 (half-toned horizontal resolution is divided by four), and the mask size is 64×32. The print mode has four levels, level 0, level 1, level 2 and level 3. Level 0 contains only 0s, and so all the relevant information is contained in levels 1, 2, 3. This is part of the architecture of this exemplary print engine.

The single or unique mask for the case with only one black printhead K for this example is the following:

next to the other, instead of one on top of the other in multi-drop printing.

Multi-drop printing can be achieved by using several print passes. Alternatively, multi-drop printing can be achieved by using a finer grid than that of the half-toning (where the levels are defined), so that dots can be placed in adjacent pixel locations of the half-toning grid, even in just one pass, although there are print head firing frequency limitations. In this example, both ways are used to achieve multi-drop printing. Bits or levels of the half-toning function correspond to the drops per pixel in different ways. The following table shows the different possibilities.

Pass 1 / Level 1

| 1 | 0 | 0 | 0 | 0 | 0 | 0 | 0 | 1 | 0 | 0 | 0 | 0 | 0 | 0 | 0 |
| 1 | 0 | 0 | 0 | 0 | 0 | 0 | 0 | 1 | 0 | 0 | 0 | 0 | 0 | 0 | 0 |

Pass 1 / Level 2

| 1 | 0 | 0 | 0 | 0 | 0 | 0 | 0 | 1 | 0 | 0 | 0 | 0 | 0 | 0 | 0 |
| 1 | 0 | 0 | 0 | 0 | 0 | 0 | 0 | 1 | 0 | 0 | 0 | 0 | 0 | 0 | 0 |

Pass 1 / Level 3

| 1 | 1 | 0 | 0 | 0 | 0 | 0 | 0 | 1 | 1 | 0 | 0 | 0 | 0 | 0 | 0 |
| 1 | 1 | 0 | 0 | 0 | 0 | 0 | 0 | 1 | 1 | 0 | 0 | 0 | 0 | 0 | 0 |

Pass 2 / Level 1

| 0 | 0 | 0 | 0 | 1 | 0 | 0 | 0 | 0 | 0 | 0 | 0 | 1 | 0 | 0 | 0 |
| 0 | 0 | 0 | 0 | 1 | 0 | 0 | 0 | 0 | 0 | 0 | 0 | 1 | 0 | 0 | 0 |

Pass 2 / Level 2

| 0 | 0 | 0 | 0 | 1 | 0 | 0 | 0 | 0 | 0 | 0 | 0 | 1 | 0 | 0 | 0 |
| 0 | 0 | 0 | 0 | 1 | 0 | 0 | 0 | 0 | 0 | 0 | 0 | 1 | 0 | 0 | 0 |

Pass 2 / Level 3

| 0 | 0 | 0 | 0 | 1 | 1 | 0 | 0 | 0 | 0 | 0 | 0 | 1 | 1 | 0 | 0 |
| 0 | 0 | 0 | 0 | 1 | 1 | 0 | 0 | 0 | 0 | 0 | 0 | 1 | 1 | 0 | 0 |

The foregoing example shows a mask of two rows and sixteen columns. The printer controller tiles down this elemental mask to the whole height of the printhead, so that facing the tiled mask to each individual nozzle in the printhead each row of the mask lines up with one nozzle of the printhead. Each mask row corresponds to the information to be fired by each nozzle where "1" means drop being fired and "0" means no drop is fired.

The example also shows different masks for different passes and levels. This means that the dots are distributed along different print passes. The levels refer to the different levels of half-toning. The half-toning is used to enable multiple firing in each pixel location. Thus, the print engine is able to, for example, place one drop for level 1, three drops for level 2 and six drops for level 3. If there are four levels, level 0, level 1, level 2 and level 3, level 0 has no information. Thus, there is a mask for each mask for each level and for each color. This allows combination of the different firing sequences of drops (single or multiple) of different color inks and in different instants of time (print passes).

The exemplary unique (single printhead) mask shown above contains many 0s. If all the print masks are summed, all 1s, corresponding to the completion of all the information to be fired) would still not result. The reason for this is that a finer printing grid is used at the half-toning stage. For this exemplary embodiment, half-toning is done at 600 dpi, and the printing is at 2400 dpi, so that each pixel is divided into four locations. This finer grid allows for dot locations one

| 1-bit | 2 levels: level 0, level 1 | Drops: 0, 1 (level 0, level 1) |
| 2-bit | 4 levels: level 0, level 1, level 2, level 3 | Drops: 0, 1, 2, 3<br>Drops: 0, 1, 3, 4<br>Drops: 0, 2, 3, 6<br>etc |

The bits determine the half-toning leveling (1-bit=2 levels, 2-bits =4 levels, . . .), while the correspondence of levels to drops per pixel can vary from one print mode to another.

The unique mask for a single color can be of arbitrary size. The controller "tiles" the mask to the whole print file (vertically and horizontally). "Tiling" the mask is a known technique whereby a defined mask of limited dimensions, i.e. x pixels in width by y pixels in height, is replicated all through the height and width of the print file. For this example, there are only six levels, where six is the maximum number of drops to be fired, but there can be less or more. The masks in the different levels can be viewed as a big mask of different layers, one layer per level.

Now, in accordance with an aspect of the invention, two black print heads K1,K2 are employed, with two mask sets, as follows:

```
K1 / Pass 1 / Level 1

1  0  0  0   0  0  0  0   0  0  0  0   0  0  0  0
0  0  0  0   0  0  0  0   1  0  0  0   0  0  0  0

K1 / Pass 1 / Level 2

1  0  0  0   0  0  0  0   0  0  0  0   0  0  0  0
0  0  0  0   0  0  0  0   1  0  0  0   0  0  0  0

K1 / Pass 1 / Level 3

1  0  0  0   0  0  0  0   1  0  0  0   0  0  0  0
0  1  0  0   0  0  0  0   0  1  0  0   0  0  0  0

K1 / Pass 2 / Level 1

0  0  0  0   1  0  0  0   0  0  0  0   0  0  0  0
0  0  0  0   0  0  0  0   0  0  1  0   0  0  0  0

K1 / Pass 2 / Level 2

0  0  0  0   1  0  0  0   0  0  0  0   0  0  0  0
0  0  0  0   0  0  0  0   0  0  1  0   0  0  0  0

K1 / Pass 2 / Level 3

0  0  0  0   1  0  0  0   0  0  1  0   0  0  0  0
0  0  0  0   0  1  0  0   0  0  0  1   0  0  0  0

K2 / Pass 1 / Level 1

0  0  0  0   0  0  0  1   0  0  0  0   0  0  0  0
1  0  0  0   0  0  0  0   0  0  0  0   0  0  0  0

K2 / Pass 1 / Level 2

0  0  0  0   0  0  0  1   0  0  0  0   0  0  0  0
1  0  0  0   0  0  0  0   0  0  0  0   0  0  0  0

K2 / Pass 1 / Level 3

0  1  0  0   0  0  0  0   1  0  0  0   0  0  0  0
1  0  0  0   0  0  0  1   0  0  0  0   0  0  0  0

K2 / Pass 2 / Level 1

0  0  0  0   0  0  0  0   0  0  1  0   0  0  0  0
0  0  0  0   1  0  0  0   0  0  0  0   0  0  0  0

K2 / Pass 2 / Level 2

0  0  0  0   0  0  0  0   0  0  1  0   0  0  0  0
0  0  0  0   1  0  0  0   0  0  0  0   0  0  0  0

K2 / Pass 2 / Level 3

0  0  0  0   0  1  0  0   0  0  0  0   1  0  0  0
0  0  0  0   1  0  0  0   0  0  0  1   0  0  0  0
```

As can be seen, the two sets above are complementary and the sum of them is the mask set with a unique K. This is evident from the following sum operations.

```
K1 + K2 / Pass 1 / Level 1

1  0  0  0   0  0  0  0   1  0  0  0   0  0  0  0
1  0  0  0   0  0  0  0   1  0  0  0   0  0  0  0

K1 + K2 / Pass 1 / Level 2

1  0  0  0   0  0  0  0   1  0  0  0   0  0  0  0
1  0  0  0   0  0  0  0   1  0  0  0   0  0  0  0

K1 + K2 / Pass 1 / Level 3

1  1  0  0   0  0  0  0   1  0  0  0   0  0  0  0
1  1  0  0   0  0  0  1   1  0  0  0   0  0  0  0

K1 + K2 / Pass 2 / Level 1

0  0  0  0   1  0  0  0   0  0  1  0   0  0  0  0
0  0  0  0   1  0  0  0   0  0  1  0   0  0  0  0

K1 + K2 / Pass 2 / Level 2

0  0  0  0   1  0  0  0   0  0  1  0   0  0  0  0
0  0  0  0   1  0  0  0   0  0  1  0   0  0  0  0
```

-continued

K1 + K2 / Pass 2 / Level 3

| 0 | 0 | 0 | 0 | 1 | 1 | 0 | 0 | 0 | 0 | 0 | 0 | 1 | 1 | 0 | 0 |
|---|---|---|---|---|---|---|---|---|---|---|---|---|---|---|---|
| 0 | 0 | 0 | 0 | 1 | 1 | 0 | 0 | 0 | 0 | 0 | 0 | 1 | 1 | 0 | 0 |

The following is the result of summing Pass 1 and Pass 2
(Pass 1 + Pass 2)

Level 1

| 1 | 0 | 0 | 0 | 1 | 0 | 0 | 1 | 0 | 0 | 0 | 1 | 0 | 0 | 0 | 0 |
|---|---|---|---|---|---|---|---|---|---|---|---|---|---|---|---|
| 1 | 0 | 0 | 0 | 1 | 0 | 0 | 1 | 0 | 0 | 0 | 1 | 0 | 0 | 0 | 0 |

Level 2

| 1 | 0 | 0 | 0 | 1 | 0 | 0 | 1 | 0 | 0 | 0 | 1 | 0 | 0 | 0 | 0 |
|---|---|---|---|---|---|---|---|---|---|---|---|---|---|---|---|
| 1 | 0 | 0 | 0 | 1 | 0 | 0 | 1 | 0 | 0 | 0 | 1 | 0 | 0 | 0 | 0 |

Level 3

| 1 | 1 | 0 | 0 | 1 | 1 | 0 | 0 | 1 | 1 | 0 | 0 | 1 | 1 | 0 | 0 |
|---|---|---|---|---|---|---|---|---|---|---|---|---|---|---|---|
| 1 | 1 | 0 | 0 | 1 | 1 | 0 | 0 | 1 | 1 | 0 | 0 | 1 | 1 | 0 | 0 |

In the foregoing example for level 3, the first 8 mask locations (first 4 in the top row and first 4 in the bottom row) represent a 600 dpi cell, while one of the mask locations represents a 2400 dpi cell. The result of adding the information of the K1 and K2 masks for this example will result in the following number of drops per level.

| 2-bit | 4 levels: level 0, level 1, level 2, level 3 | Drops: 0 (level 0), 2 (level 1), 2 (level 2), 4 (level 3) |
|---|---|---|

In this exemplary case, the two mask sets (K1 and K2) are each loaded with 50% of the drops, but other patterns could alternatively be employed, wherein an unequal drop distribution between the two printheads is used.

Figure 2:
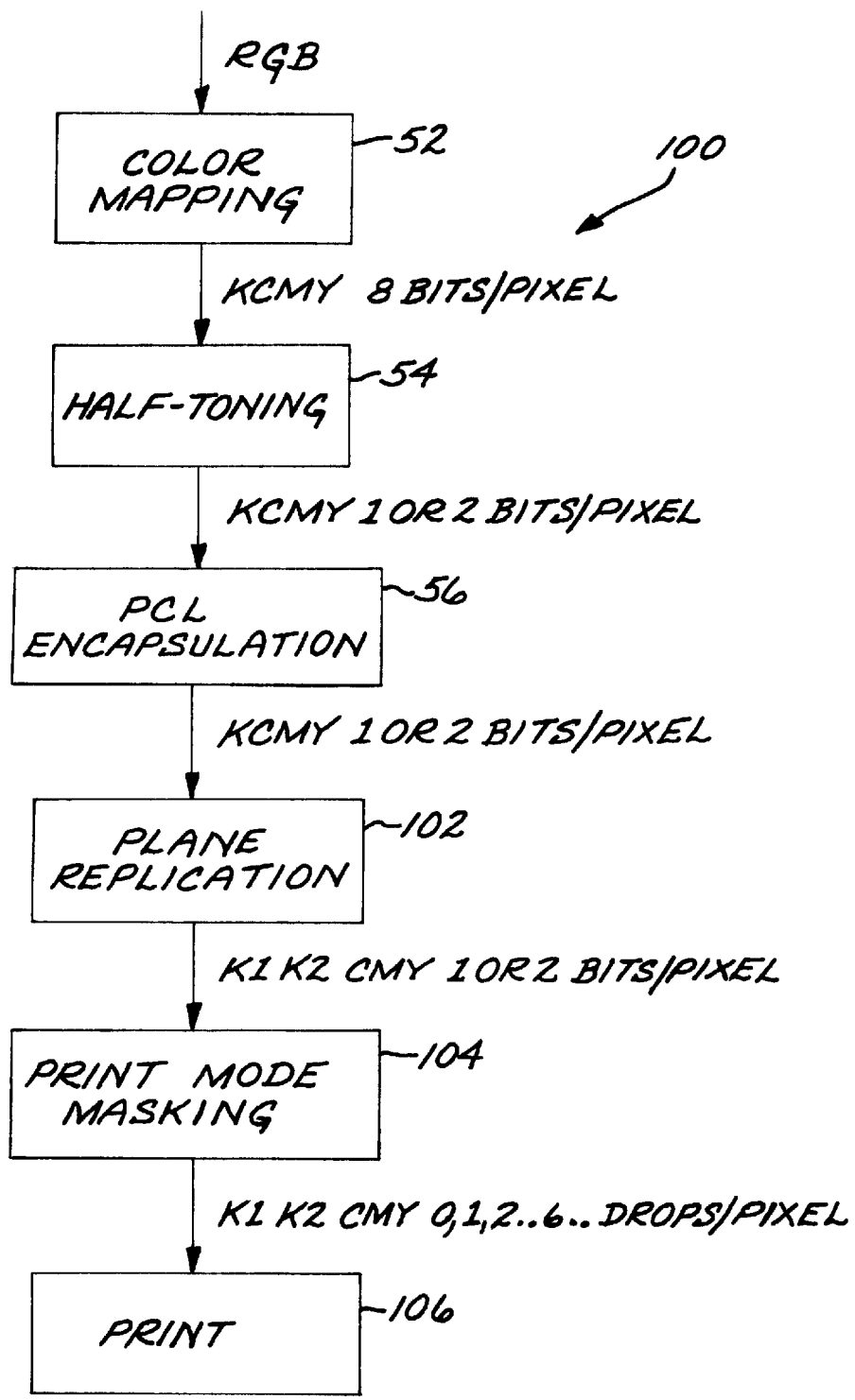
FIG. 2 is a schematic flow diagram of a printing system data pipeline which provides separation of the black data into two planes, for two black printheads K1/K2.

FIG. 2 is a schematic flow diagram of a printing system data pipeline 100 which provides separation of the black data into two planes, for two black printheads K1/K2. This pipeline includes the initial three steps 52, 54, 56 as in the pipeline 50 of FIG. 1, to perform color mapping (52), half-toning (54) and PCL encapsulation (56) in the incoming print data. The print data from step 56 is passed to a plane replication function 102, which replicates the K data (single plane) into two identical black planes for the K1, K2 printheads, producing K1K2CMY data at 1 or 2 bits per pixel for this embodiment. This data is then passed to the print mode masking function 104, where the separate K1/K2 masks are applied to the data, as well as the CMY masks, producing K1K2CMY 0,1,2, . . . 6 . . . drops per pixel. The data from the print mode masking function is then passed to the print function to produce the actual drops during printing operations.

Thus, in accordance with an aspect of the invention, after the PCL encapsulation at step 56, the black plane is copied to a new one and thus the K information is exactly the same for this other K2 plane. There are now two black planes, for K1 and K2. Complementary print masks are used to split the data between the two black printheads prior to printing. The mask sets for each plane are less than 100% coverage (for example, 50% and 50%). If not, twice the number of drops would be fired. Of course, more than two black printheads could be employed, e.g. by replicating the black plane twice, i.e. forming K1, K2, K3 planes, and then providing complementary print mask sets for the three planes.

The complexity of the masks will grow with its size and design requirements but overall it is an easy method and easy to implement, since the print data pipeline is not modified drastically.

Figure 3:
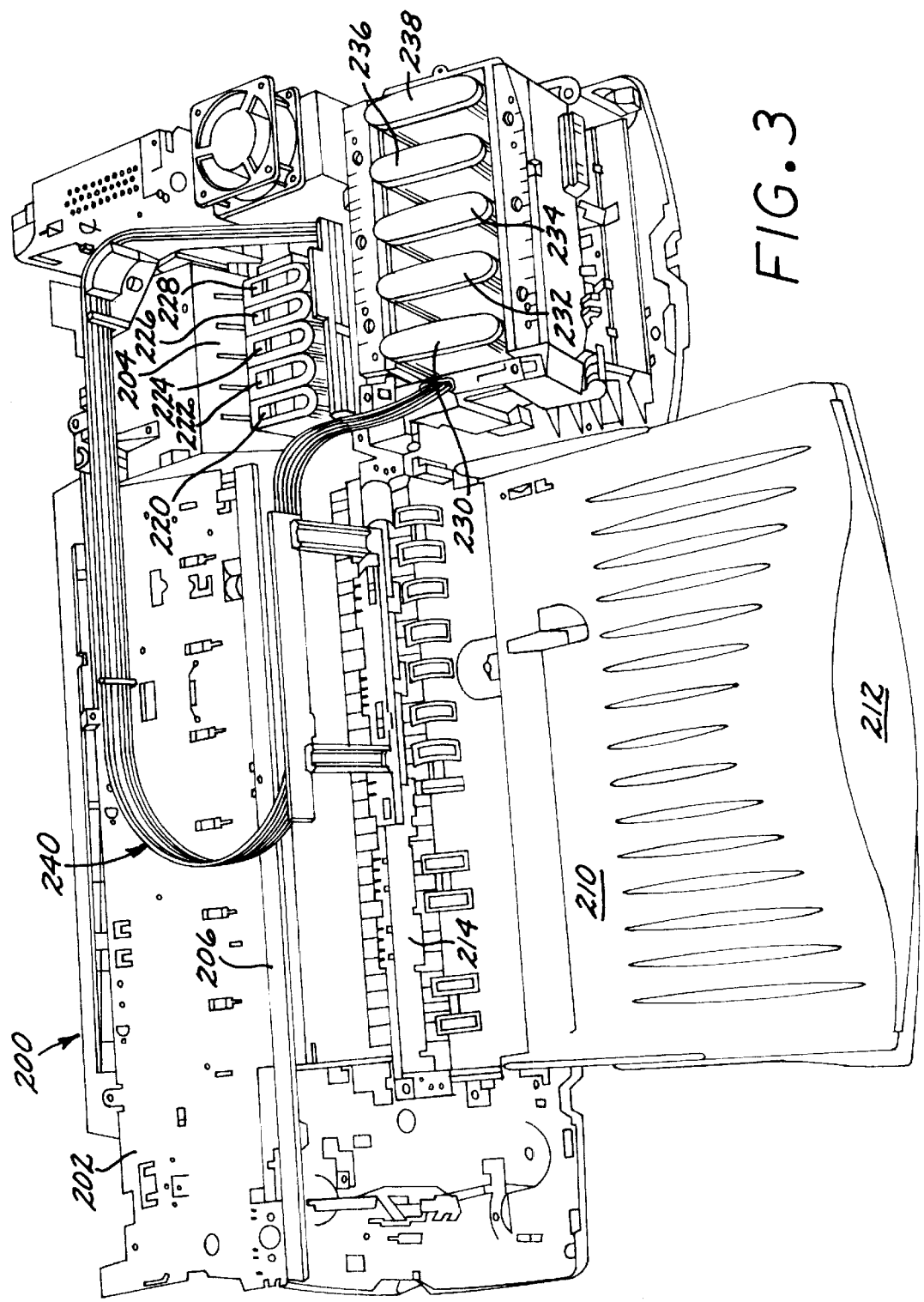
FIG. 3 is an isometric view of an inkjet printing system employing two printheads of the same color in accordance with an aspect of this invention.

FIG. 3 is an isometric view of an inkjet printing system 200 employing two printheads of the same color in accordance with an aspect of this invention. The printing system 200 is shown without its outer housing structure to expose the printheads. The printing system includes a frame structure 202 and a printhead carriage structure 204. The frame supports a slider bar 206, and the carriage structure is driven along the slider bar by a carriage drive system. An output media tray 210 is supported above an input media tray 212 which provides a source of print media. A pick system picks the top sheet of media from the tray 212, and a media drive system transports the picked sheet along a media path to the print zone generally indicated as 214. The carriage structure 204 has five printhead stalls for holding five removable inkjet printheads 220, 222, 224, 226, 228, which for this exemplary embodiment are C/K1/K2/M/Y printheads, respectively. Thus, for this example, the two black printheads are located between the cyan and magenta printheads. Other ordering of the respective printheads could be used. However, this ordering facilitates a technique placing cyan or magenta drops before and after a black drop to provide higher optical density for the black areas. These extra drops are not information in the print file, but are used to obtain a better ink-media interaction resulting in higher optical density. In bi-directional print modes, cyan drops are placed ahead of the two black drops (K1, K2), and in the reverse print direction, the magenta drops precede the two black drops.

The printing system 200 further includes five off-carriage ink supplies 230, 232, 234, 236, 238, each for holding a supply of ink. Each ink supply is fluidicially coupled to a corresponding printhead by a fluid conduit, here including a flexible tube comprising tube set 240. As the carriage traverses its path of travel during printing operations, the printheads are connected to corresponding ink supplies to replenish the ink supplies on-board each printhead. Each ink supply can be replaced when its ink is exhausted.

Figure 4:
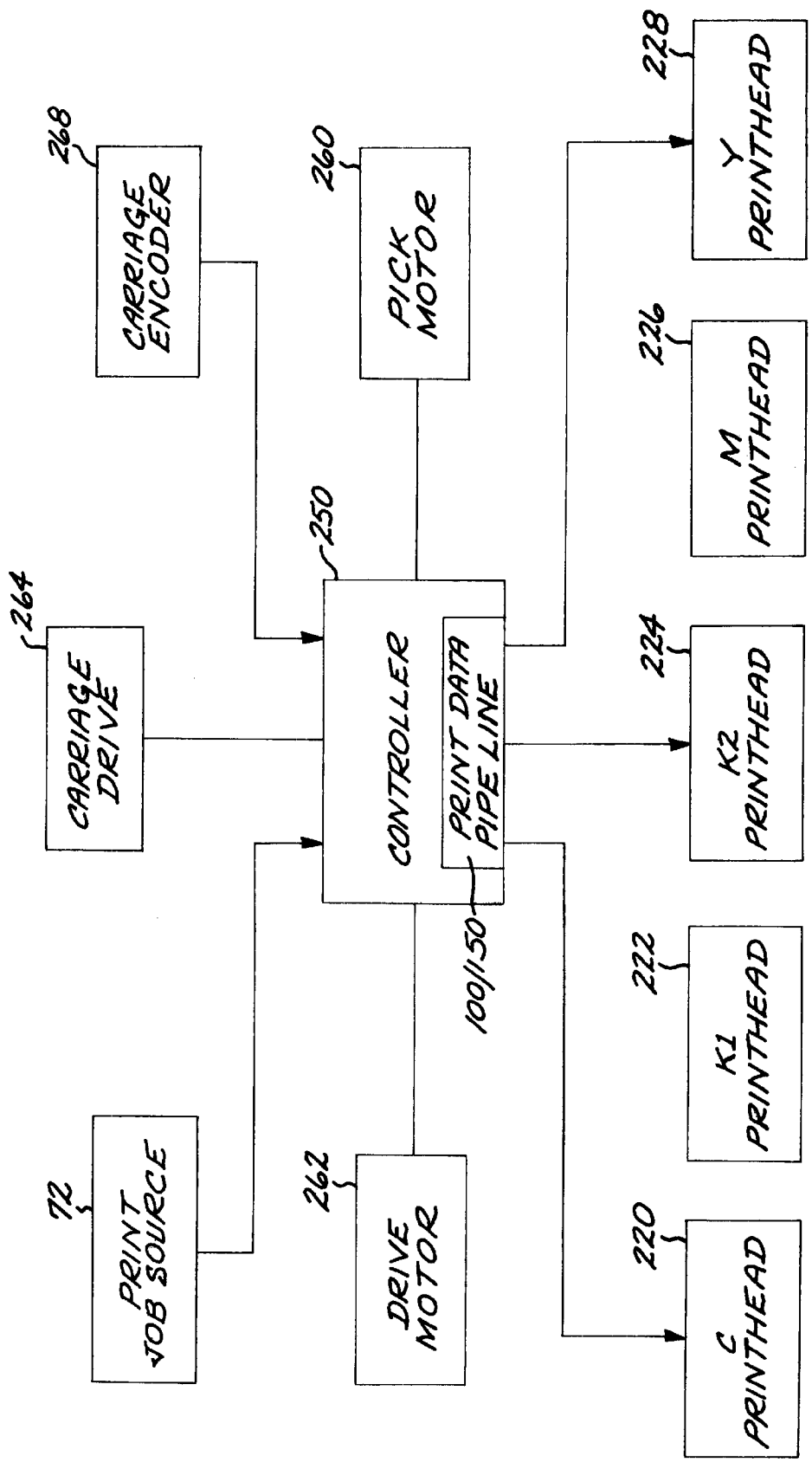
FIG. 4 is a schematic block diagram of the control system for the printing system of FIG. 3.

FIG. 4 is a schematic block diagram of the control system for the printing system 200 of FIG. 3. A controller 250 such as a microcomputer or ASIC receives print job commands and data from a print job source 72, which can be a personal computer, digital camera or other source of print jobs. The controller implements the functions of the print data pipeline 100 (FIG. 2), acts on the received commands to activate the pick roller motor 260 to pick a sheet from the input tray 212, advance the sheet to the media drive, e.g. to a nip between a drive roller and pinch roller set, and activate the drive motor system 262 to advance the sheet onto the belt, and move the belt to advance the sheet to the print zone. The carriage drive 264 is driven by the controller to position the carriage 204 for commencement of a print job, and to scan the carriage along the slider rod 206. As this is done firing pulses are sent to the printheads 220–228. The controller receives encoder signals from the carriage encoder 268 to provide position data for the carriage. The controller is programmed to advance incrementally the sheet to position the sheet for successive swaths, and to eject the completed sheet into the output tray 210.

FIGS. 3 and 4 represent an exemplary embodiment of an inkjet printing system embodying aspects of the invention. Other inkjet printing systems could alternatively be employed, including systems with disposable printhead cartridges and no off-carriage ink supplies, systems with greater than five printheads, by way of example only.

Other techniques for separating the black plane into two black planes could alternatively be employed. For example, in a second embodiment, the black print data is a unique plane until they reach the half-toning step. Two K planes are generated during half-toning. The data for each K plane is different, and these two different K planes propagate through the remainder of the pipeline, i.e. through the PCL ensapsulation and print mode masking steps to the printing step (FIG. 1). Further advantages can be optionally provided by using plane dependent half-toning, by using error diffusion half-toning, and by treating the two K planes as secondary colors in the half-toning algorithm. Conventional printmode masking is employed in this embodiment, i.e the masks for the two K planes are not complementary as in the embodiment of FIG. 2, and in fact are preferably identical.

Error diffusion algorithms for half-toning are well known. In general, error diffusion is used to convert from the "continuous tone" (contone) stage of the information to the "half-toned" stage. In the contone stage, the information can be encoded with 8 bits, for example, and therefore the possible values of a channel are from 0 to 255 (example RGB values on a display or CMYK values sent from a driver to a printer). Thus, each pixel has the color information encoded with one byte (one byte is 8 bits) for each color or plane. If for example, the input format is CMYK, the pixel has possible values C[0–255], M[0–255], Y[0–255], K[0–255].

The half-toning step provides a reduction in the amount of information for each pixel, while preserving overall color characteristics. After the half-toning, the information for each color or plane is encoded with generally 1, 2 or 3 bits of information. Consider the case of two- bits/color output half-toning. A color channel enters the half-toning step with possible values [0–255], and output with only four possible values, namely 0, 1, 2, 3 (two bits of information can only represent four different values). For the case of one bit output half-toning, also called binary half-toning, the only possible output values for one color at the output are 0 or 1, since one bit only has two states. In the case of three-bit half-toning, possible output values for the color of a pixel are [0–7], since 3 bits can encode 8 different values.

The error diffusion principle is the following. When the pixel reaches the half-toning step, it is attributed an output value that minimizes the error, i.e., the mismatch between the output value that is attributed to the given color for the pixel and the input value of this given color for this pixel. For example, consider a pixel of an image reaching the half-toning step with a value cyan=140, in an 8-bit scale [0–255]. For two-bit half-toning, the only possible output values are 0, 1, 2 or 3. Thus, none of the possible output levels or values (0, 1, 2, 3, or 0%, 33.3%, 66.6%, 100%) represents exactly the input value (140/255, or 54.9%), so an error is committed. If the output level for this pixel is set to level 2 (66.6%), the error is 11.7%. If the output level for the pixel is set to level 1 (33.3%) for this color of this pixel, the error reaches 21.56%. The error would be even higher if level 0 or level 3 is used. A goal of error diffusion half-toning techniques is to reduce this error.

To illustrate error diffusion half-toning, consider the following example. A pixel enters with a cyan level of 45 (out of 255), and is attributed level 1 out of 4. This pixel is "over attributed" 7% on the cyan channel, i.e. the error is +7%. This error is then summed to the next pixel's input value of the same channel before deciding which output is given to the neighbor. For this example of a 7% error, this error would be added on the cyan channel before deciding which output is given to the neighboring pixel. This is the process of error diffusion.

Plane dependent error diffusion goes one step further, as it defines dependencies between specific planes (generally between cyan and magenta). So in this case, the error committed over one plane is taken into account, but the sum of errors of each dependent plane is calculated for a pixel to decide its output value. This is described in U.S. Pat. No. 6,057,933, the entire contents of which are incorporated herein by this reference. This allows the avoidance of pixels accumulating drops from the dependent planes (say one pixel with cyan + magenta drops) if the neighboring pixels do not have drops, and therefore leads to a noticeable reduction of the "grainy" aspect on inkjet print samples.

A second technique for separating the black plane into separate planes for the two black printheads, i.e. for deciding which ink drops will be printed by each black printhead, is described. In this case, the separation of the black plane is done in the half-toning function. An exemplary embodiment of this technique takes advantage of the "plane dependant error diffusion" functionality described above, and described in U.S. Pat. No. 6,057,933, although the invention is not limited to error diffusion or plane dependent half-toning. In this embodiment, then, the black plane is separated at the half-toning step, and the two black output planes (which carry different information) are printed using the classical processes as if they were different colors. The method is random and the droplet printing order is not deterministic. The following example will be applied to the example of a printer with two black printheads, such as printer 200 (FIG. 3).

This alternate technique includes several steps:

i) The RGB image data or KCMY data is received by the printing system from a computer or print job sender device.

ii)) The image data corresponding to the black color plane will be processed as if it were a secondary color (for example, green). This means that the printer controller 250 will calculate and assign ink drops from two different primary color planes (in the example cyan and yellow) to achieve the desired secondary color. The result of this step is two color planes whose addition would result in the original black image half-toned data. The droplets have been assigned to each plane using the plane dependant error diffusion algorithm described above. In order to minimize the grain aspect due to the black drops, a dependency is established between the two planes that contain the black information, e.g. the cyan and yellow planes for the example.

iii) The resulting print data in 2 color planes from step (ii) will be directed to respective two black printheads which will deliver black droplets to the paper to form the desired image. Thus, the processor calculates the black plane as though it is to be produced using a composite of two primary colors, e.g. cyan and yellow, and then sends this pseudo "cyan" and "yellow" print data to two black print heads instead of a cyan and a yellow print head. Of course, the print data for these primary colors to make up the black data is kept separate from the actual print data for the cyan and yellow channels, by assigning a fifth (black 2) plane for the second black channel.

Figure 5:
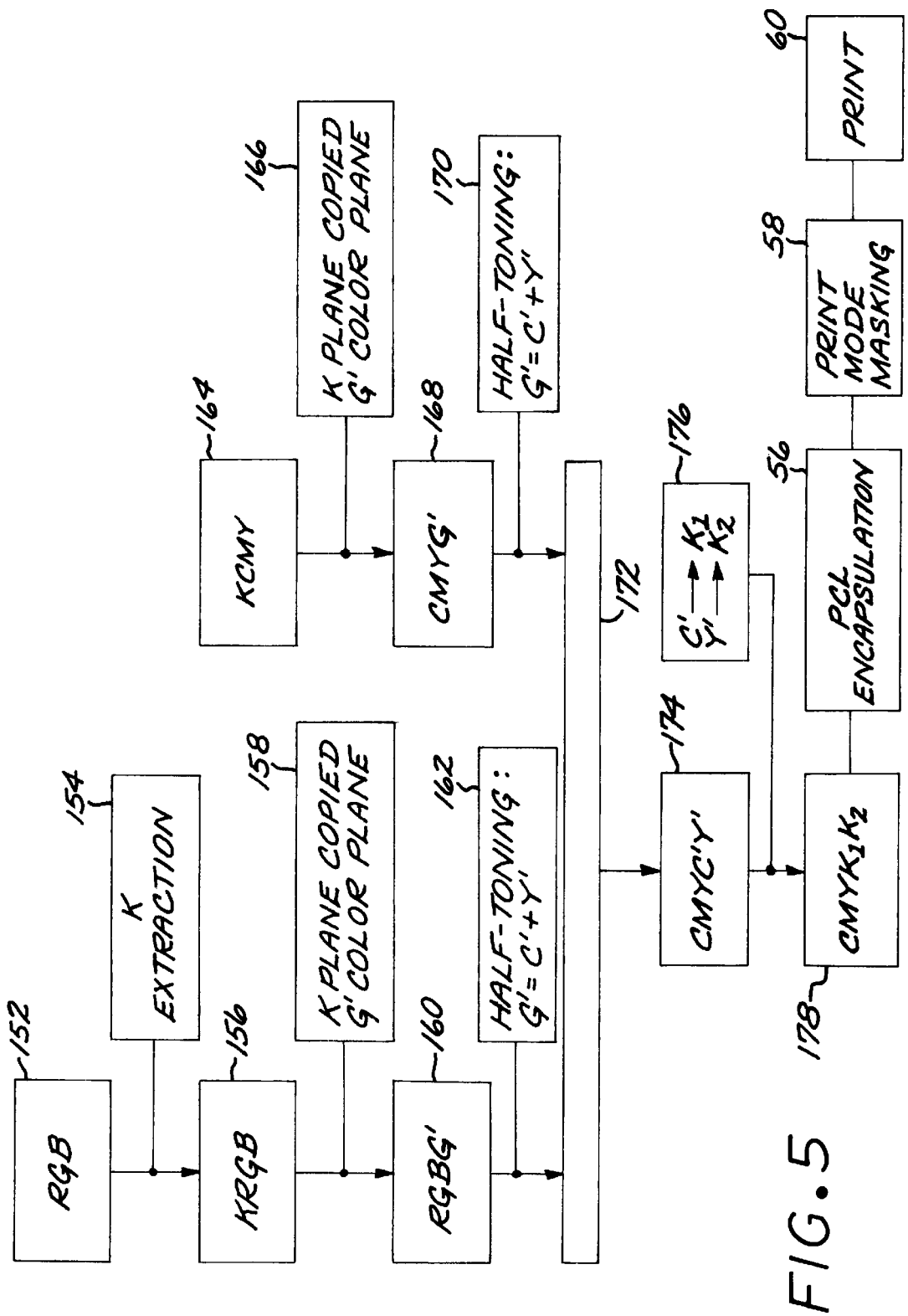
FIG. 5 illustrates an exemplary flow diagram for implementing an alternate embodiment of a technique for printing black ink droplets using two black print heads.

FIG. 5 illustrates an exemplary flow diagram for implementing this technique for printing black ink droplets using two black print heads. FIG. 5 shows alternate cases, for an RGB driver as well as for a CMYK driver. For the case of an RGB driver, the RGB contone print data 152 is received, and the black (K) data is extracted at 154 to provide KRGB data at 156. There are various techniques for extracting black information from RGB data. One technique is to use a lookup table that associates given values for K, R, G, B for a given set of input R, G, B values. Another technique is to use an algorithm, such as the following example: (i) Calculate the minimum ($K_o$) of R, G, B values. (ii) Calculate the difference between $K_o$ and the value of each channel, i.e. dR is the difference on R, dG is the difference on G, and dB is the difference on B. (iii) Calculate K=255-$K_o$. (iv) Set for an RGB value the KdRdGdB values. These are just illustrative examples for extracting the black information.

At step 158, the K plane is copied to a G1 color plane, producing RGBG' print data at 160. At 162, the RGBG' data is first converted into G'CMY data, and the G' data is split into C'+Y' data, wherein the G' plane is to be printed by special cyan and yellow planes, C', Y', i.e. G'=C'+Y'. A half-toning process is then performed on the data, producing half-toned CMYC"Y" data at 174.

In the case of a KCYM contone driver, the KCMY contone data 164 is processed at step 166, where the K plane is copied to form the G' color plane, producing CMYG' print data (168). This data is half-toned at 170, producing G'=C'+Y', and thus half-toned CMYC'Y' data at 174.

At step 174, the data are independent of the particular driver, and the C' and Y' planes are set to the K1, K2 planes respectively, at 176, producing print data CMYK1K2 data at 178. This data are now passed through the classical masking process (step 58, FIG. 1), where K1, K2 are treated as if they were different colors, and the drops are ejected. The masks used to print K1, K2 in this case are not complementary, and in fact can be identical. The masks with this alternate embodiment will deliver any pixel information from the color plane K1 or K2 to the print media, unlike the case with the first embodiment (FIG. 2) where a drop is fired by either one or the other black printhead.

Thus, in an exemplary form, the second embodiment (FIG. 5) takes advantage of the plane dependent error diffusion half-toning technique. To print a given secondary color, ink drops from primary colors will be calculated and assigned to pixels, following a half-toning technique that will randomize the spatial positions of the drops for each of the primary colors. Plane dependent error diffusion techniques provides some level of spatial exclusion, so that drops fired by each of the primary color printheads will tend to occupy different places on the print media. This provides less granularity to the printed images, and this is particularly appropriate for this application where ink drops are to be printed with the same color (black in this example). For example, when printing a gray color, it would be desirable to cover as much white paper as possible for a certain ink density rather than placing several black drops together in some places and leaving large white areas on other places. The first procedure delivers a more uniform color appearance, whereas the second procedure causes the presence of dark black areas and dull white areas with a perception of granularity.

Of course, this second technique for separating the black plane into two planes could be employed with other techniques for half-toning, and is not limited to error diffusion half-toning.

Another technique for separating the black plane into two planes is that one black print head is mainly printing all the black pixels that contain low density (1 or 2 drops). The other black printhead helps out with those pixels demanding more drops so that these can be printed in less passes. Thus, for this alternate embodiment, more than one black ink drop is delivered to the pixels on the print media so that the desired ink density is achieved. Exemplary multilevel printing techniques are employed in the Hewlett-Packard PhotoRet system, for example, used in some HP DeskJet printers such as the HP DeskJet 970 and the Professional Series 2000. Multi-level printing is illustrated in the following table.

|  | 2-Bit Encoding | Equivalent in # of drops (exemplary only) |
| --- | --- | --- |
| Level 0 | 00 | 0 |
| Level 1 | 01 | 1 |
| Level 2 | 10 | 2 |
| Level 3 | 11 | 4 |

In accordance with a third embodiment for separating the black print data into two planes, certain of the levels, e.g. levels 00, 01, 10, are assigned to the first black printhead (K1), and the level 11 is assigned to the second black printhead (K2). In this exemplary case, if a pixel contains a 11, the second black printhead (K2) will fire 4 drops on that pixel, whereas a pixel value of 01 or 10 will be printed by the first printhead (K1).

The following table with exemplary pixel input data further illustrates the operation of this third embodiment.

| Position | Input Data | K1 Drops | K2 Drops |
| --- | --- | --- | --- |
| Pixel #1 | 01 | 1 | 0 |
| Pixel #2 | 00 | 0 | 0 |
| Pixel #3 | 10 | 2 | 0 |
| Pixel #4 | 11 | 0 | 4 |

Thus, this third embodiment is particularly adapted to a printer having the capability to print multiple dots per pixel, for example 2 bits or four levels. The output pixel data levels or values are divided between the printheads of the same color, so that for example one prints the dots for lower levels and another prints higher levels, or in the case of three printheads of the same color, a third printhead prints the dots for an intermediate level (s). The result of a split between lower and higher levels is that one black printhead does most of the work and is occasionally helped by the second black printhead for very dark areas. This will mean that the first printhead will have to be replaced more frequently, and will lay down more ink, but that the second printhead will need to be replaced only very infrequently.

Figure 6:
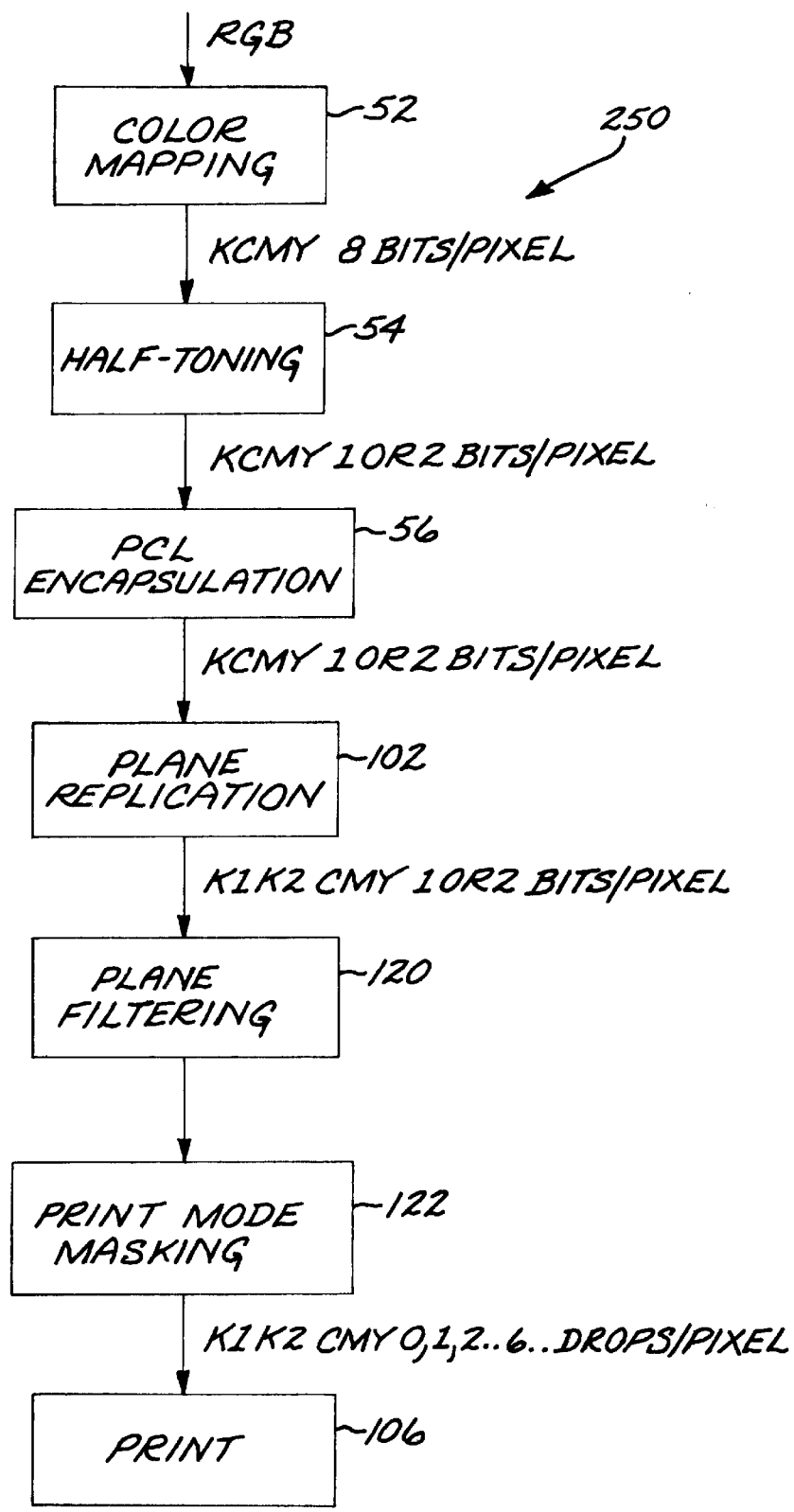
FIG. 6 illustrates an exemplary data pipeline for implementing a embodiment of the invention.

FIG. 6 illustrates an exemplary data pipeline for implementing this embodiment of the invention. For this exemplary embodiment, steps 52, 54, 56 and 102 are identical to the corresponding steps of the pipeline shown in FIG. 2, and result in two identical black data planes, K1, K2. Step 120 is a plane filtering step. Here the two identical planes for K1 and K2 are filtered or divided in such a way that the pixel data for levels assigned to one printhead are set to 0s in the data plane of the other printhead, and vice versa. For the example where there are four levels, and level 0 is all zeros with no pixel information, the pixel data for level 3 in the K1 data plane is set to all 0's since level 3 data is to be printed by the K2 printhead, and the pixel data for levels 1 and 2 in the K2 data plane are set to all 0's, since levels 1 and 2 are to be printed by the K1 printhead. Standard printmode masking and printing steps 122 and 106 follow.

As an alternative to the plane filtering step 120, the levels could be assigned to K1 and K2 respectively, by setting the print mode mask levels for one black plane which are assigned to the other plane to all 0's, and vice versa.

In accordance with a further aspect of the invention, error hiding (nozzle replacement or substitution) can be performed between the two printheads of the same color very easily and effectively. That is, if a nozzle on one printhead fails, the data that should have been printed by that nozzle can be redirected to the equivalent nozzle, in the same relative location, on the other printhead. This in turn means that the error hiding or nozzle substitution can be performed within the same swath. In contrast, if error hiding is performed within the same printhead, then, since each nozzle passes over a unique part of the print media, the backup nozzle cannot print the failed nozzle's data in the same pass, but must wait for a media advance. Techniques for error hiding are described in commonly assigned application Ser. No. 08/810,467, filed Mar. 4, 1997, DYNAMIC MULTI-PASS PRINT MODE CORRECTIONS TO COMPENSATE FOR MALFUNCTIONING INKJET NOZZLES, and in commonly assigned application Ser. No. 09/506,740, filed Feb. 18, 2000, METHOD OF PRINTING TO AUTOMATICALLY COMPENSATE FOR MALFUNCTIONING INKJET NOZZLES, the entire contents of which applications are incorporated herein by this reference.

Figure 7:
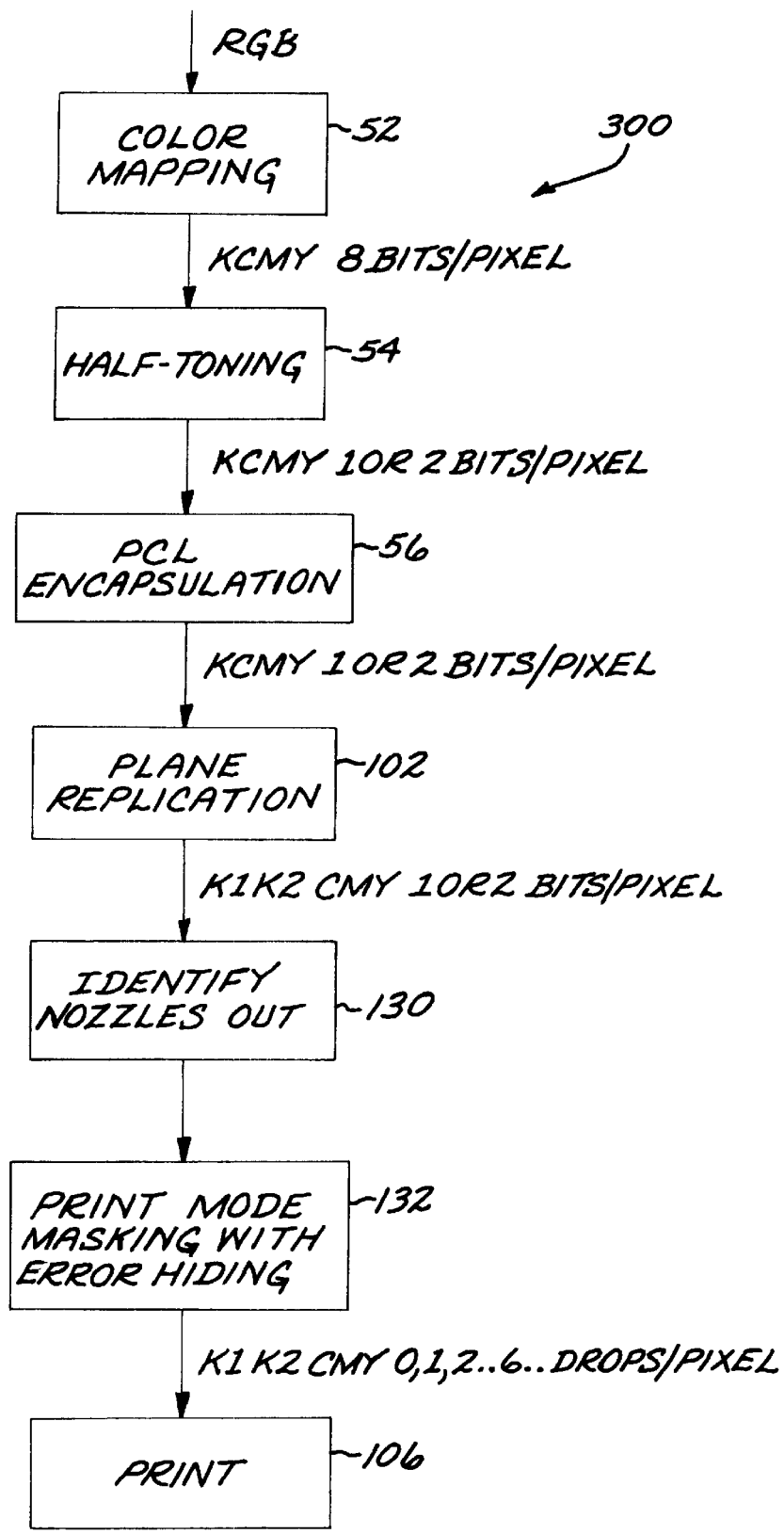
FIG. 7 is an exemplary print data pipeline with an error hiding function in accordance with a further aspect of the invention.

This error hiding function is particularly well suited to implementation with the embodiment described above regarding FIG. 2, and an exemplary print data pipeline 300 with the error hiding function is shown in FIG. 7. The steps 52, 54, 56, 102 are identical to those comprising the pipeline 100 of FIG. 2, and identical K1 and K2 data planes are established. Step 130 indicates a step of identifying failed nozzles, e.g. nozzles which do not fire or which misdirect their ink drops. Typically for purposes of this aspect of the invention, the nozzle arrays for printheads K1 and K2 will be tested to identify failed nozzles. Techniques for identifying failed nozzles are known in the art. For example, the printer can periodically check for failed nozzles by printing a test pattern on a print medium, and then optically scan the test image with a carriage-mounted optical sensor to detect nozzles which have failed. Another technique is to use an optical drop detector in a service station to detect blocked or misdirected nozzles. Suitable techniques are described in the above-references application numbers 08/810,467 and 09/506,740. The step 130 can be performed each time a print job is to be printed, or periodically and the results saved for use until another test of the nozzles is performed.

Figure 8:
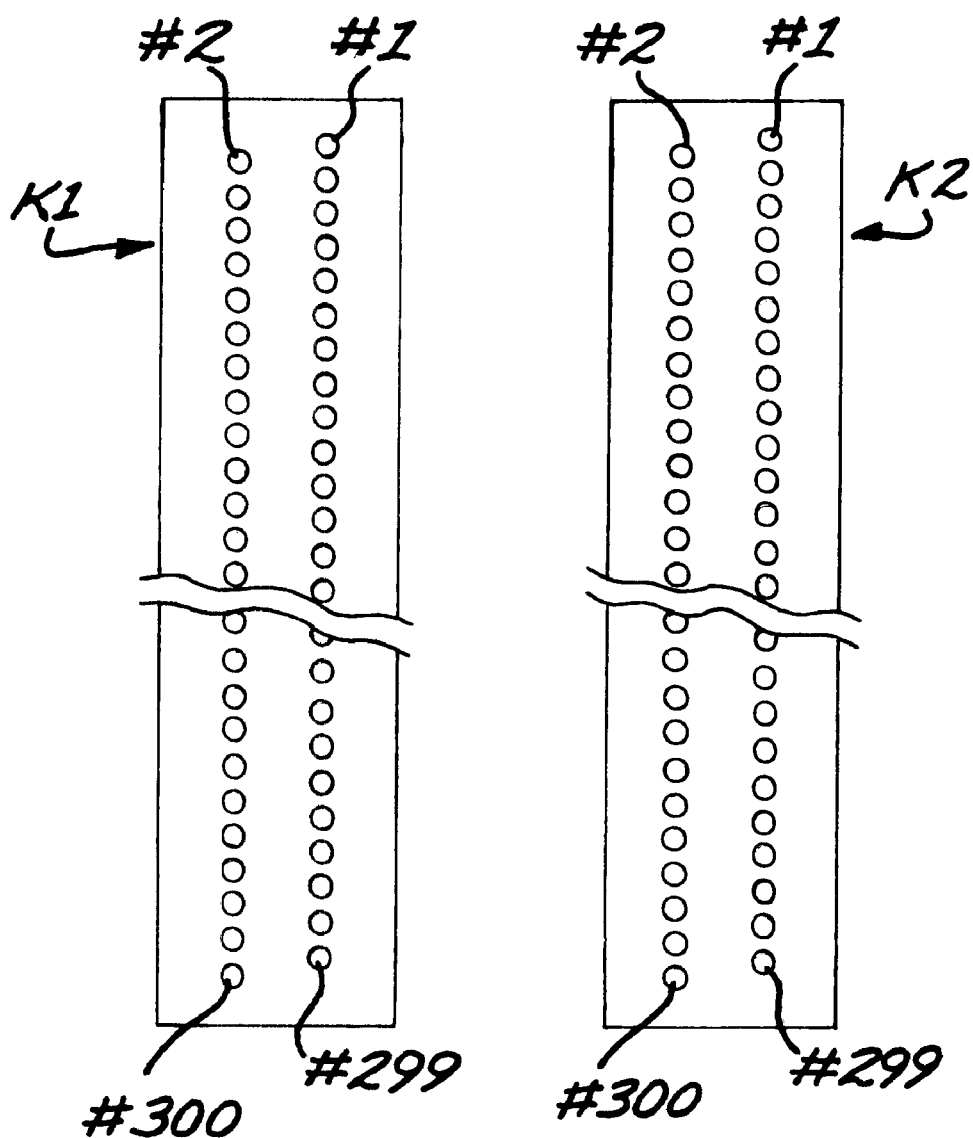
FIG. 8 is a schematic illustration of exemplary nozzle arrays for the K1 and K2 printheads.

With the failed nozzles identified (130), the print mode masking step 132 is performed. Here, the same complimentary masks as described above with respect to the embodiment of FIG. 2 provide the initial masks to be applied to the K1 and K2 data planes. However, to implement error hiding of the identified failed nozzles, the data that should have been printed by the failed nozzles on one black printhead are redirected to the equivalent nozzle, in the same relative location, on the other black printhead. This is illustrated in FIG. 8, which shows exemplary nozzle arrays for K1 and K2. Assume for example that nozzle #2 of K1 has failed. The data which should have been printed by that nozzle is instead printed by nozzle #2 of K2. This result can be readily achieved by use of the print mode masks, where the mask position for nozzle #2 of K1 is changed from 1 to 0, and the mask position for Nozzle #2 of K2 is changed from 0 to 1. Thus, the resulting masks are no longer strictly complementary due to the error hiding. Now the masks are applied to the identical data planes K1, K2 to print the dots at 106.

Thus, the present invention relates to a method to print ink drops in an inkjet printer, and particularly to a printing system and method where at least one color ink can be printed by two (or more) printheads. The method divides the drops to be printed between the two printheads with purposes of higher printer velocity, higher image quality and higher print reliability.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for printing ink drops in an inkjet printing system where image pixels of a given color can be printed by two or more printheads ejecting droplets of said given color and mounted in a scanning printhead carriage, the method comprising:

receiving print data from a print job source;

producing from the print data a first plane for said given color;

replicating the first plane to produce a second plane for said given color;

using said first plane to produce a first set of printhead data signals for producing droplets, and said second plane to produce a second set of printhead data signal for producing droplets;

applying said first and second sets of printhead data signals to first and second printheads each for emitting droplets of said given color.

2. The method of claim 1 wherein said step of using said first plane and using said second plane includes applying a first mask to said first plane to produce said first set, and applying a second mask to said second plane to produce said second set.

3. The method of claim 2 wherein said first and second masks are complementary.

4. The method of claim 1 wherein said applying step results in said first printhead ejecting 50% of the drops for said given color, and said second printhead ejecting 50% of the drops for said given color.

5. A method for printing ink drops in an inkjet printing system where image pixels of a given color can be printed by two or more printheads each including a nozzle array for ejecting droplets of said given color and mounted in a scanning printhead carriage which moves over a print media in successive passes and swaths, and wherein a first printhead nozzle array has one or more failed nozzles, the method comprising:

receiving print data from a print job source;

producing from the print data a first plane for said given color;

replicating the first plane to produce a second plane for said given color;

using said first plane to produce a first set of printhead data signals for producing droplets, and said second plane to produce a second set of printhead data signals for producing droplets, wherein pixel data to be printed using said one or more of said failed nozzles is redirected to be printed by a corresponding equivalent one or more nozzles on a second printhead nozzle array;

applying said first and second sets of printhead data signals to first and second printheads each for emitting droplets of said given color, thereby providing nozzle substitution for said one or more failed nozzles.

6. The method of claim 5, wherein said step of applying said first and second sets of printhead data signals to said first and second printheads is performed during the same print swath of carriage movement so that said nozzle substitution occurs during a single swath without requiring a media advance.

7. A method for printing ink drops in a color inkjet printing system using yellow, cyan, magenta and black inks, and wherein black image pixels are printed by two or more printheads ejecting droplets of black ink, comprising:

providing print data defining a print job, said print data in respective yellow, cyan and magenta data planes and a first black data plane;

replicating the first black data plane to produce a second black data plane;

using said first black plane to produce a first set of black printhead data signals for producing black ink droplets, and said second black plane to produce a second set of black printhead data signals for producing black ink droplets;

using said yellow, cyan and magenta data planes to respectively produce a set of yellow printhead data signals, a set of cyan printhead data signals and a set of magenta data signals;

applying said first and second sets of black printhead data signals to first and second black ink printheads, said set of yellow printhead data signals to a yellow ink printhead, said set of cyan printhead data signals to a cyan ink printhead and said set of magenta printhead data signals to a magenta ink printhead.

8. The method of claim 7 wherein said step of using said first black plane and using said second black plane includes applying a first mask to said first black plane to produce said first set, and applying a second mask to said second black plane to produce said second set.

9. The method of claim 8 wherein said first and second masks are complementary.

10. The method of claim 7 wherein said applying step results in said first printhead ejecting 50% of black ink droplets for said print data, and said second printhead ejecting 50% of the black ink droplets for said print data.

11. A method for printing ink drops in an inkjet printing system where image pixels of a given color can be printed by two or more printheads ejecting droplets of said given color and mounted in a scanning printhead carriage, the method comprising:

receiving print data from a print job source;

producing from the print data a first plane for said given color comprising contone values;

processing the contone values to produce two or more different planes of respective half-tone values corresponding to a number of ink droplets to be printed to represent respective pixels by said two or more printheads;

using said two or more planes of half-tone values to produce corresponding two or more sets of printhead data signals for producing droplets;

applying said two or more sets of printhead data signals to said two or more printheads each for emitting droplets of said given color.

12. The method of claim 11, wherein said processing step employs an error diffusion half-toning algorithm.

13. The method of claim 11, wherein said processing step employs a plane-dependent half-toning algorithm.

14. A method for printing ink droplets in a color inkjet printing system using yellow, cyan and magenta inks and a secondary color ink, yellow, cyan and magenta inks being primary colors of ink, and wherein image pixels of the secondary color are printed by two or more printheads ejecting droplets of said secondary color ink, comprising:

providing respective yellow, cyan and magenta and said secondary color data planes, said respective planes defining a colored image to be printed by the printing system;

processing the secondary color data plane to determine first and second pseudo primary color planes whose addition results in the secondary color plane;

using said first pseudo primary plane to produce a first set of secondary color printhead data signals for producing secondary color ink droplets, and said second pseudo primary plane to produce a second set of black printhead data signals for producing secondary color ink droplets;

using said yellow, cyan and magenta data planes to respectively produce a set of yellow printhead data signals, a set of cyan printhead data signals and a set of magenta data signals;

applying said first and second sets of secondary color printhead data signals to first and second secondary ink printheads, said set of yellow printhead data signals to a yellow ink printhead, said set of cyan printhead data signals to a cyan ink printhead and said set of magenta printhead data signals to a magenta ink printhead.

15. The method of claim 14 wherein the first pseudo primary plane is a pseudo cyan plane, the second pseudo primary plane is a pseudo yellow plane and the secondary color is black.

16. A method for printing ink droplets in a color inkjet printing system using yellow, cyan and magenta inks and a secondary color ink, yellow, cyan and magenta inks being primary colors of ink, and wherein image pixels of the secondary color are printed by two or more printheads ejecting droplets of said secondary color ink, comprising:

providing respective yellow, cyan and magenta and said secondary color data planes, said respective planes defining respective contone values for pixels of a color image to be printed by the printing system;

converting the contone values of the respective yellow, cyan and magenta color data planes into respective values corresponding to a number of ink droplets to be printed to represent respective pixels;

converting the contone values of the secondary color plane into respective first and second pseudo primary color plane values corresponding to respective numbers of ink droplets of the respective first and second primary colors whose addition results in the secondary color plane;

using said first pseudo primary plane values to produce a first set of secondary color printhead data signals for producing secondary color ink droplets, and said second pseudo primary plane values to produce a second set of secondary color printhead data signals for producing secondary color ink droplets;

using said yellow, cyan and magenta data planes values to respectively produce a set of yellow printhead data signals, a set of cyan printhead data signals and a set of magenta data signals;

applying said first and second sets of secondary color printhead data signals to first and second secondary ink printheads, said set of yellow printhead data signals to a yellow ink printhead, said set of cyan printhead data signals to a cyan ink printhead and said set of magenta printhead data signals to a magenta ink printhead.

17. The method of claim 16 wherein the converting steps are performed using an error diffusion halftoning algorithm.

18. The method of claim 16 wherein the first pseudo primary plane is a pseudo cyan plane, the second pseudo primary plane is a pseudo yellow plane and the secondary color is black.

19. A method for printing ink drops in an inkjet printing system where image pixels of a given color can be printed by two or more printheads ejecting droplets of said given color and mounted in a scanning printhead carriage, the method comprising:

receiving print data from a print job source;

producing from the print data a first plane for said given color comprising contone values;

processing the contone values by an n-bit half-toning algorithm to produce respective half-tone values corresponding to a number of ink droplets to be printed to represent respective pixels, wherein n is an integer larger than 1, so that the half-tone values can represent multiple dots per pixel;

using said half-tone values to produce multiple levels of printhead data signals for producing said dots;

dividing said multiple levels of printhead data signals between the two or more printheads;

applying said divided levels of printhead data signals to said two or more printheads each for emitting droplets of said given color.

20. The method of claim 19 wherein said given color is black.

21. The method of claim 19 wherein said two or more printheads consists of a first printhead and a second printhead mounted on said scanning carriage.

22. The method of claim 21 wherein a lower level is assigned to said first printhead, and an upper level is assigned to said second printhead.

* * * * *